Patented July 10, 1945

2,379,917

UNITED STATES PATENT OFFICE 2,379,917

ESTERS OF CARBOXYCELLULOSE

Herman F. Mark and Sidney Siggia, Brooklyn, N. Y., assignors to E. I. du Pont de Nemours & Company, Wilmington, Del., a corporation of Delaware No Drawing. Application August 11, 1943, Serial No. 498,264

14 Claims. (Cl. 260—212)

This invention relates to cellulose derivatives. More particularly, it relates to esters of carboxycellulose.

It is known that when cellulose is oxidized, by means of certain special oxidizing agents, the best known of which are periodic acid and lead tetraacetate, the bond uniting the two adjacent carbinol groups (between carbons 2 and 3) is split to give a product containing aldehydic and carboxyl groups and variously called cellulose dicarboxylic acid, carboxycellulose or oxycellulose-1. This product, which will be referred to hereinafter as carboxy cellulose, has (when the oxidation has reached the carboxyl group stage) the formula

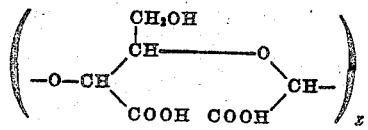

It will be observed from the above formula that, when cellulose is oxidized by means of the glycol-splitting agents referred to above, the primary alcohol group of the anhydroglucose unit remains unoxidized. The carboxycellulose used as the starting material in this invention should therefore not be confused with the product variously called pectic acid, polygalacturonic acid or oxycellulose-2, in which only the primary alcohol group is oxidized and which has the formula

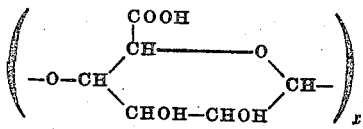

The latter product is obtained by treating cellulose with nitrogen dioxide, as shown in U. S. Patent 2,232,990.

Carboxycellulose is unstable and degrades on standing, thus seriously limiting industrial applications of this relatively new cellulose derivative. It has now been found that the esters of carboxycellulose, which were heretofore unknown, are free from this disadvantage.

An object of this invention is to make available a new class of cellulose derivatives, namely, the esters of carboxycellulose. Another object is to provide processes for the preparation of these esters. Yet another object is to make available esters of carboxycellulose wherein the degree of esterification varies from partial to complete and which possess a wide range of physical properties. Further objects will become apparent as the description proceeds.

These objects are accomplished by the present invention of esters of carboxycellulose and processes therefor.

In one method of carrying out this invention, carboxycellulose is treated with an alcohol in the presence of an acidic esterification catalyst at elevated temperature, preferably at the boiling point of the alcohol employed, until the desired degree of esterification is attained, which can be determined by titrating the number of carboxyl groups still present per anhydroglucose unit. In another method, which is particularly useful to prepare esters of high boiling alcohols, an already prepared ester of carboxycellulose with a low boiling alcohol (e. g., the methyl ester) is treated with a higher boiling alcohol at elevated temperature, preferably in the presence of an ester interchange catalyst, whereby an exchange of alcoholic radicals takes place, the lower boiling alcohol is removed and the ester of the higher boiling alcohol is obtained.

The carboxycellulose used as the starting material in the following examples was prepared by oxidation of cellulose with periodic acid, using a 0.5 N solution of potassium periodate brought to a pH of 1 to 2 by addition of $H_2SO_4$. Although this process is not part of the claimed invention, the following gives the details of the procedure: (Cf. Jackson and Hudson, J. Am. Chem. Soc. 59, 2049, (1937); 60, 989, (1938); Davidson, Shirley Inst. Memoirs, 18, 69, (1941); Rutherford, Minor, Martin and Harris, J. Res. Nat. Bu. Stand. 29, 131 (1942).

One part of air dry cellulose in the form of cotton linters (shredded wood pulp may also be used) is placed in a glass flask provided with a ground glass stopper. One hundred parts of an aqueous 0.5 N solution of sodium metaperiodate containing the equivalent amount of sulfuric acid is added and the flask is placed in a thermostat at 20° C. It is taken out at intervals, gently shaken by hand and replaced in the thermostat. After six hours, about 20% of the theoretical amount of oxygen is absorbed and about 20% of all the secondary alcohol groups is converted into aldehydic or carboxylic groups. Substantially complete oxidation may be achieved by continuing the reaction for several days. In general, it is desirable to convert all the incompletely oxidized (aldehydic) groups to carboxyl groups and this may be done by a 40-60 minute treatment of the sample with chlorous acid, obtained by acidifying a solution of sodium chlorite to pH 2.5 with acetic acid (see Rutherford et al., supra). The carboxycellulose thus obtained is washed with distilled water until acid-free and dried in air.

If it is preferred to oxidize the cellulose in organic solvent solution, the use of lead tetraacetate instead of periodic acid is advantageous. Here also it is desirable to use a large excess of the oxidizing agent at room temperature with gentle stirring or occasional shaking.

The invention is illustrated by the following examples, in which the word "parts" signifies parts by weight unless otherwise noted.

*Example I*

Five parts of carboxycellulose of carboxyl content 0.138 —COOH group per glucose unit is refluxed with a solution of about 3 parts sulfuric acid in 80 parts methyl alcohol for sixteen hours. The product is washed with methyl alcohol, then with distilled water and dried at 70° C. under vacuum. The product contains .049 ester group per glucose unit as determined by the Zeisel method for the determination of methoxyl groups and also by determining the number of carboxyl groups remaining (original carboxyl content per glucose unit—carboxyl content after esterification=ester content per glucose unit). This determination was carried out by the silver salt method of Harris, J. Res. Natl. Bur. Standards, October 1942. The esterified carboxycellulose is partly soluble in NaOH solutions but is insoluble in the common organic solvents; acetone, ethyl alcohol, ethyl ether, benzene, toluene and methyl ethyl ketone. It is a white, amorphous mass lacking any fibrous characteristics.

*Example II*

Five parts of carboxycellulose of carboxyl content 0.231 —COOH group per glucose unit is refluxed with a solution of about 3 parts of $H_2SO_4$ in 80 parts ethyl alcohol for sixteen hours. The product is washed with ethyl alcohol, then with distilled water and dried at 70° C. under vacuum. The product contains .060 ester group per glucose unit as determined by measuring the number of carboxyl groups per glucose unit still remaining after esterification. This product is partly soluble in NaOH solutions but insoluble in the common organic solvents such as acetone, methyl alcohol, ethyl ether, benzene, toluene, and methyl ethyl ketone. The product is white and hardly fibrous at all.

*Example III*

Five parts of carboxycellulose of carboxyl content 0.231 —COOH group per glucose unit is refluxed with a solution of about 3 parts of $H_2SO_4$ in 80 parts n-propyl alcohol for sixteen hours. The product is washed with n-propyl alcohol, then with distilled water and dried at 70° C. under vacuum. The esterified carboxycellulose contains .050 ester group per glucose unit, as determined by measuring the number of carboxyl groups per glucose unit still remaining after esterification. The product is partly soluble in NaOH solutions, but insoluble in common organic solvents such as acetone, methyl alcohol, ethyl alcohol, ethyl ether, benzene, toluene, and methyl ethyl ketone. The product is white and hardly fibrous at all.

*Example IV*

Five parts of carboxycellulose having a carboxyl content of about 0.45 —COOH group per glucose unit is refluxed with 150 parts of methyl alcohol for ten hours while hydrogen chloride is bubbled through continuously. The reaction product is washed with methyl alcohol, then with distilled water and finally dried at 70° C. under reduced pressure. It contains about 0.40 ester group per glucose unit, as shown by determining either the esterified carboxyl groups or the free carboxyl groups. This relatively highly esterified carboxycellulose is soluble in a number of organic solvents such as acetone or chloroform.

*Example V*

Five parts of the methyl ester of carboxycellulose, prepared as described in Examples I or IV, is suspended in 100 parts of butanol containing 2 parts of sodium hydroxide. After six hours' heating at 100° C., the product is separated and washed as usual. It is found that about 50% of the carbomethoxy groups has been converted into carbobutoxy groups, thus giving a mixed ester of carboxycellulose.

According to this invention, it is possible to prepare any desired ester of carboxycellulose. The alcohol residue of the ester group can be that of any alcohol, including, in addition to those used in the several examples, the higher aliphatic alcohols such as octyl, decyl, dodecyl, tetradecyl, octadecyl alcohols; secondary and tertiary alcohols such as isobutanol, tertiary amyl alcohol, etc.; cyclo aliphatic alcohols such as cyclohexanol; aromatic alcohols such as benzyl or phenylethyl alcohol; phenols such as phenol itself, the cresols, the xylenols, naphthols, etc.; unsaturated alcohols such as allyl alcohol, crotyl alcohol, geraniol oleyl alcohol, cinnamyl alcohol, propargyl alcohol, etc.; and polyhydric alcohols such as ethylene glycol, propylene glycol, glycerol, etc. Mixed esters can also be prepared, e. g., methyl-butyl esters or isopropyl-hexadecyl esters. Obviously, the various alcohols do not all esterify with the same ease, and the yields of carboxycellulose esters and/or the amount of esterification are bound to be lower with the less reactive species. The best results are obtained with primary alkanols of up to seven carbon atoms.

With regard to the degree of esterification of the carboxycellulose esters, two variables come into consideration: (a) the carboxyl content per anhydroglucose unit of the starting material, carboxycellulose, and (b) the degree of esterification per anhydroglucose unit of the final ester. With regard to (a), it is possible to prepare carboxycelluloses in which the carboxyl content per anhydroglucose unit varies from very low, e. g., 0.1 COOH group, to the maximum, i. e., 2 COOH groups. These products in turn can be esterified partly or completely. Thus by partial esterification of a carboxycellulose of low carboxyl content, it is possible to obtain esters containing very small proportion of ester groups, such as 0.03 ester group per anhydroglucose units and even less. Such products still contain free carboxyl groups. Or, the low carboxyl content carboxycellulose may be substantially completely esterified to give products which, while containing only a small proportion of ester groups per anhydroglucose unit, e. g., 0.1 or less, are nevertheless substantially free from unreacted carboxyl groups. At the other end of the scale, a highly carboxylated cellulose, i. e., a carboxycellulose containing between 1.5 and 2 carboxyl groups per anhydroglucose unit, may be partly or totally esterified to give either esters still containing free carboxyl groups or substantially completely esterified products.

Thus, a wide range of materials showing a correspondingly wide range of physical properties is available. The lowly esterified materials are, in general, insoluble in organic solvents. When they contain free carboxyl groups, they are partly or completely soluble in aqueous alkali, depending upon the amount of free carboxyl groups present. The highly esterified materials, on the other hand, are generally soluble in organic solvents, and they may also be soluble in aqueous alkali if sufficient free carboxyl groups are still present. The solubility characteristics are also influenced by the nature of the alcoholic radical, long chain radicals tending to increase the solubility in organic solvents.

In general, esters containing up to 0.5 ester group per glucose unit are easier to obtain than the more highly substituted products, and, since their technical properties are satisfactory, such esters are preferred.

In the process wherein carboxycellulose is reacted directly with an alcohol at high temperature, it is in general preferred to carry out the esterification at the boiling point of the alcohol. However, when the esterification catalyst used has a charring action on cellulose at high temperature (this is the case with sulfuric acid, for example) this procedure can be used only with alcohols of rather low boiling point, e. g., not much in excess of 100° C. With higher boiling alcohols, a milder catalyst is advantageously used, such as p-toluene-sulfonic acid or phosphoric acid, or else the esterification temperature is kept suitably low. In general, the esterification is conveniently carried out at temperatures ranging from 50° C. to 150° C. The amount of esterification depends on the reaction time, the reaction temperature, and the molecular weight of the alcohol used. By proper selection of these variables, it can be varied widely, as has already been discussed. In this method of esterification, any of the well-known, conventional acidic esterification catalysts can be used. To those already mentioned may be added hydrochloric acid, sodium acid sulfate, benzenesulfonic acid, etc.

The ester interchange method is particularly advantageous when esters of high molecular weight alcohols are desired. It is preferable to use, as the already formed ester, an ester of alcohol boiling below or not much above the temperature at which the reaction is carried out. In practice, therefore, it is advantageous to select a carboxycellulose ester of an alcohol boiling not above butyl alcohol, e. g., the methyl, ethyl, propyl, isopropyl, butyl or isobutyl esters of carboxycellulose. The reaction temperature is preferably between 50° and 200° C., and the resulting lower boiling alcohol is preferably removed as soon as it forms. While the use of a catalyst is not entirely necessary, any of the conventional ester interchange catalysts may be used with advantage, such as caustic alkalies, zinc chloride, ferric chloride, ammonium chloride, boron trifluoride, the sulfonium iodides, hydrochloric acid, phosphoric acid, p-toluenesulfonic acid, etc.

In either method, the carboxycellulose ester obtained is purified and isolated by any of the procedures known in the cellulose art. In general, it is sufficient to wash the product with a solvent which removes the excess alcohol and catalyst, and dry, either at room temperature or at elevated temperature, if desired under reduced pressure. If the carboxycellulose ester is soluble in alkali, it may be dissolved in aqueous sodium hydroxide, reprecipitated by acidification, and washed with water. If it is soluble in an organic solvent such as acetone, it may be dissolved therein and reprecipitated by addition of water.

The new carboxycellulose esters made available by this invention may be used in the production of spun filaments or cast films from organic solvent or alkaline solutions. They are also useful as molding powders, intermediates in chemical syntheses, etc. They have the great advantage over carboxy-cellulose itself (particularly the more highly carboxylated products) that they are stable and do not degrade on standing, i. e., the molecular weight remains substantially unchanged on long storage.

The above description and examples are intended to be illustrative only. Any modification of or variation therefrom which conforms to the spirit of the invention is intended to be included within the scope of the claims.

We claim:
1. An ester of carboxycellulose.
2. An ester of carboxycellulose with a primary alkanol of up to seven carbon atoms.
3. A methyl ester of carboxycellulose.
4. An ethyl ester of carboxycellulose.
5. A propyl ester of carboxycellulose.
6. A butyl ester of carboxycellulose.
7. A mixed ester of carboxycellulose with butanol and methanol.
8. A process for the preparation of a carboxycellulose ester which comprises heating carboxycellulose with an esterification catalyst and an alcohol.
9. A process for the preparation of a carboxycellulose ester which comprises heating carboxycellulose with an esterification catalyst and a primary alcohol of up to seven carbon atoms.
10. A process for the preparation of a carboxycellulose ester which comprises heating carboxycellulose with an esterification catalyst and a primary alkanol of up to seven carbon atoms.
11. A process for the preparation of esters which comprises reacting a carboxycellulose ester in the preesnce of an ester interchange catalyst with an alcohol of boiling point higher than that of the alcohol of said carboxycellulose ester.
12. An ester of carboxycellulose with an alkanol.
13. An ester of carboxycellulose with a primary alkanol.
14. An ester of carboxycellulose having carboxyl hydrogen replaced by hydrocarbon.

HERMAN F. MARK.
SIDNEY SIGGIA.